(12) United States Patent
Ishihara et al.

(10) Patent No.: US 7,594,145 B2
(45) Date of Patent: Sep. 22, 2009

(54) IMPROVING PERFORMANCE OF A PROCESSOR HAVING A DEFECTIVE CACHE

(75) Inventors: Tohru Ishihara, Fukuoka (JP); Farzan Fallah, San Jose, CA (US)

(73) Assignee: Fujitsu Limited, Kanagawa (JP)

( * ) Notice: Subject to any disclaimer, the term of this patent is extended or adjusted under 35 U.S.C. 154(b) by 368 days.

(21) Appl. No.: 11/421,365

(22) Filed: May 31, 2006

(65) Prior Publication Data

US 2007/0294587 A1    Dec. 20, 2007

(51) Int. Cl.
*G06F 11/00* (2006.01)
(52) U.S. Cl. .............. 714/47; 714/8; 714/42; 714/44; 711/141; 711/144; 711/210
(58) Field of Classification Search .......... 714/8, 714/42, 44, 47; 711/141, 144, 210
See application file for complete search history.

(56) References Cited

U.S. PATENT DOCUMENTS

| | | | | |
|---|---|---|---|---|
| 6,006,311 | A  * | 12/1999 | Arimilli et al. | 711/133 |
| 6,182,164 | B1 * | 1/2001 | Williams | 710/15 |
| 7,177,986 | B2 * | 2/2007 | Rowlands et al. | 711/144 |
| 7,197,670 | B2 * | 3/2007 | Boatright et al. | 714/42 |
| 7,366,953 | B2 * | 4/2008 | Huott et al. | 714/36 |
| 2003/0088811 | A1* | 5/2003 | Cherabuddi et al. | 714/42 |
| 2006/0059474 | A1* | 3/2006 | Bhansali et al. | 717/151 |

OTHER PUBLICATIONS

Koren et al., "Fault Tolerance in VLSI Circuits," IEEE Computer, Special Issue in Fault-Tolerant Systems, vol. 23, No. 7, pp. 73-83, Jul. 1990.
Stapper et al., "Yield Model for Productivity Optimization of VLSI Memory Chips with Redundancy and Partially Good Product," IBM Journal of Research and Development, vol. 24, No. 3, pp. 398-409, May 1980.
Sohi, "Cache Memory Organization to Enhance the Yield of High-Performance VLSI Processors," IEEE Transactions on Computers, vol. 38, No. 4, pp. 484-492, Apr. 1989.
Pour et al., "Performance Implications of Tolerating Cache Faults," IEEE Trans. on Computers, vol. 42, No, 3, pp. 1-20, Mar. 1993.
Luo et al., "A Fault-Tolerant Multiprocessor Cache Memory," Proc. IEEE Workshop on Memory Technology, Design and Testing, pp. 52-57, Aug. 1994.
Montanaro et al., "A 160 MHz, 32b, o.5W CMOS RISC Microprocessor," 1996 IEEE International Solid-State Circuits Conference, Digest of Technical Papers, pp. 214-215, Feb. 1996.

(Continued)

*Primary Examiner*—Robert Beausoliel
*Assistant Examiner*—Charles Ehne
(74) *Attorney, Agent, or Firm*—Baker Botts L.L.P.

(57) ABSTRACT

In one embodiment, a method for improving performance of a processor having a defective cache includes accessing first object code and generating second object code from the first object code. The generation of the second object code takes into account one or more locations of one or more defects in a cache on a processor such that one or more instructions in the second object code are written only to nondefective locations in the cache.

12 Claims, 2 Drawing Sheets

OTHER PUBLICATIONS

Saxena et al., "Fault-Tolerant Features in the HaL Memory Management Unit," IEEE Trans. on Computers, vol. 44, No. 2, pp. 170-179, Feb. 1995.

Gallup et al., "Testability Features of the 68040," in Proc. of International Test Conference, pp. 749-757, Sep. 1990.

Ooi et al., "Fault-Tolerant Architecture in a Cache Memory Control LSI," IEEE Journal of Solid-State Circuits, vol. 27, No. 4, pp. 507-514, Apr. 1992.

Patterson et al., "Architecture of a VLSI Instruction Cache for a RISC," In Conference Proceedings, The 10th Annual International Symposium on Computer Architecture, vol. 11. No. 3, pp. 108-116, Jun. 1983.

Shirvani et al., "PADded Cache: A New Fault-Tolerance Technique for Cache Memories," In Proceedings of 17th IEEE VLSI Test Symposium, pp. 440-445, Apr. 1999.

Lucente et al., "Memory System Reliability Improvement Through Associative Cache Redundancy," In Proceedings of IEEE Custom Integrated Circuits Conference, pp. 19.6.1-19.6.4, May 13-16, 1990.

Vergos et al., "Performance Recovery in Direct-Mapped Fualty Caches via the Use of a Very Small Fully Associative Spare Cache," In Proc. of International Computer Performance and Dependability Symposium, pp. 326-332, Apr. 24-26, 1995.

Vergos et al., "Efficient Fault Tolerant Cache Memory Design," Microprocessing and Microprogramming Journal, vol. 41, No. 2, pp. 153-169, May 1995.

Hill et al., "Evaluating Associativity in CPU Caches," IEEE Trans. on Computers, vol. 38, No. 12, pp. 1612-1630, Dec. 1989.

McFarling, S., "Program Optimization for Instruction Caches," In Proceedings of International Conference on Architecture Support for Programming Languages and Operating Systems, pp. 183-191, Apr. 1989.

Hwu et al., "Achieving High Instruction Cache Performance with an Optimizing Compiler," In Proceedings of ISCA, pp. 242-251, May 1989.

Tomiyama et al., "Optimal Code Placement of Embedded Software for Instruction Caches," In Proceedings of European Design and Test Conference, pp. 96-101, Mar. 1996.

Panda et al., "Memory Organization for Improved Data Cache Performance in Embedded Processors," In Proceedings of the 9th International Symposium on System Synthesis, pp. 90-95, Nov. 1996.

Hashemi et al., "Efficient Procedure Mapping Using Cache Line Coloring," In Proc. of Programming Language Design and Implementation, pp. 171-182, Jun. 1997.

Ghosh et al., "Cache Miss Equations: A Compiler Framework for Analyzing and Tuning Memory Behavior," ACM Transactions on Programming Languages and Systems, vol. 21, No. 4, pp. 703-746, Jul. 1999.

Motorola Inc., "PowerPC 604e RISC Microprocessor Technical Summary," 1996, pp. 1-33.

IBM Microelectronics Division, "The PowerPC 440 Core," 1999, pp. 1-18.

Hill, S., "The ARM 10 Family of Embedded Advanced Microprocessor Cores," In Proceedings of HOT-Chips 13, 6 pages, Aug. 2001.

Suzuki et al., "V830R/AV: Embedded Multimedia Superscalar RISC Processor," IEEE Micro. vol. 18, No. 2, pp. 36-47, Apr. 1998.

* cited by examiner

IMPROVING PERFORMANCE OF A PROCESSOR HAVING A DEFECTIVE CACHE

TECHNICAL FIELD OF THE INVENTION

This invention relates in general to memory systems and more particularly to improving performance of a processor having a defective cache.

BACKGROUND OF THE INVENTION

A processor (such as an embedded microprocessor) typically includes one or more caches that occupy a large percentage of the area of the processor. For example, approximately half of the total chip area of a StrongARM SA-110 processor is devoted to two 16 KB caches. Cache arrays are particularly susceptible to faults, and the tolerance of cache faults significantly affects the yield of processors that include caches.

Overview

Particular embodiments of the present invention may reduce or eliminate problems and disadvantages associated with processors having defective caches.

In one embodiment, a method for improving performance of a processor having a defective cache includes accessing first object code and generating second object code from the first object code. The generation of the second object code takes into account one or more locations of one or more defects in a cache on a processor such that one or more instructions in the second object code are written only to nondefective locations in the cache.

Particular embodiments of the present invention may provide one or more technical advantages. As an example and not by way of limitation, particular embodiments improve performance, e.g., speed up operation, of processors having defective caches. In particular embodiments, defect-aware code placement reduces performance degradation of a processor having a cache that is only partially good. Particular embodiments modify the placement of basic blocks, or functions, in an address space of a cache to reduce or even minimize the occurrence of cache misses in a defective cache. Particular embodiments may provide all, some, or none of these technical advantages. Particular embodiments may provide one or more other technical advantages, one or more of which may be readily apparent to those skilled in the art from the figures, descriptions, and claims herein.

BRIEF DESCRIPTION OF THE DRAWINGS

To provide a more complete understanding of the present invention and features and advantages thereof, reference is made to the following description, taken in conjunction with the accompanying drawings, in which.

DESCRIPTION OF EXAMPLE EMBODIMENTS

Figure 1:
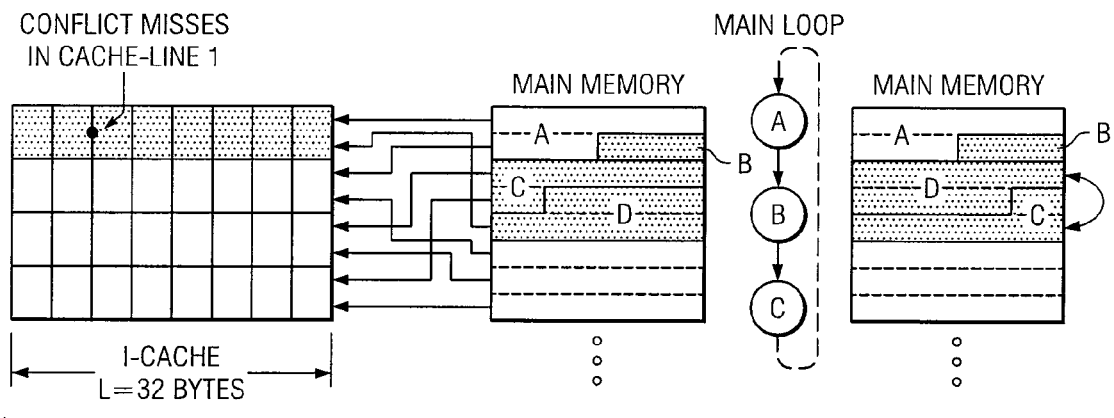
FIG. 1 illustrates example code placement.

FIG. 1 illustrates example code placement. Consider a direct-mapped cache of size C ($=2^m$ words) having a cache line size of L words, i.e., L consecutive words are fetched from the main memory on a cache read miss. In a direct-mapped cache, the cache line containing a word located at memory address M may be calculated by $$\lfloor \frac{M}{L} \rfloor \bmod \frac{C}{L}.$$

Therefore, memory locations $M_i$ and $M_j$ are mapped to the same cache line if:

$$\left( \lfloor \frac{M_i}{L} \rfloor - \lfloor \frac{M_j}{L} \rfloor \right) \bmod \frac{C}{L} = 0 \tag{1}$$

As an example and not by way of limitation, assume a direct-mapped cache having four cache lines that are each thirty-two bytes. Functions A, B, C and D may be put into the main memory as shown on the left side of FIG. 1. If the processor accesses functions A, B, and D in a loop, conflict misses occur because A and D are mapped to the same cache line. Swapping the locations of C and D as shown on the right side of FIG. 1 resolves the cache conflict. In particular embodiments, code placement modifies the placement of basic blocks or functions in an address space to reduce the total number of cache conflict misses.

Figure 2:
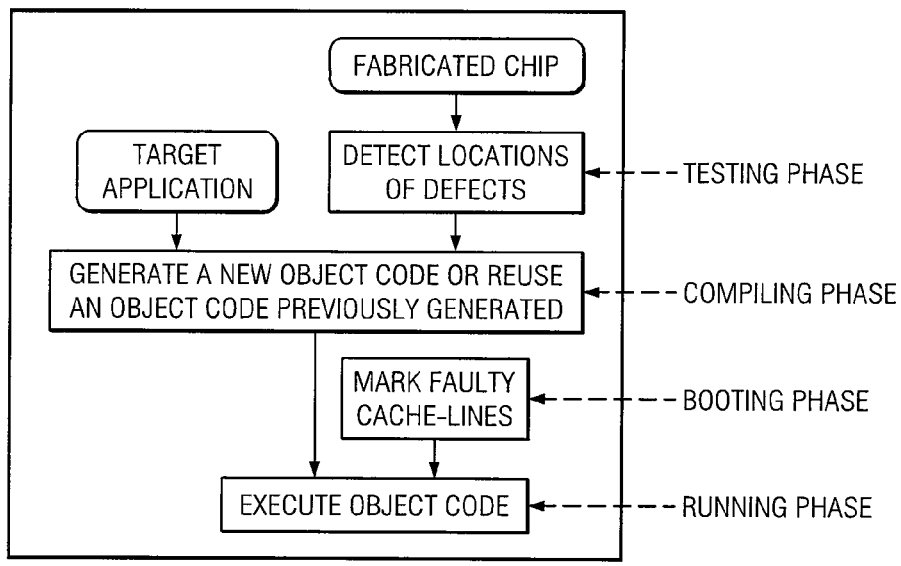
FIG. 2 illustrates an example flow of the technique.

FIG. 2 illustrates an example method for code placement. In particular embodiments, the method detects the locations of defects in a cache and then generates object code that keeps the number of cache misses below a predetermined number. Recompilation need occur only if the original object code fails to provide the performance required of a particular chip. If the original object code provides the required performance, the method uses the original object code. If the original object code does not provide the required performance, but object code generated to address a previous defect provides the required performance, the method uses the object code generated to address the previous defect. When the chip is turned on, the chip executes an initialization step during which, based on information collected during test, faulty cache-lines are marked using lock and valid bits. The chip then executes the compiled code. Particular embodiments generate object code while taking into account the locations of defective cache lines in a cache on a processor so that instructions in the object code are, where possible, written only to nondefective cache lines in the cache, which tends to reduce the cache misses caused by the defects. Particular embodiments also lock defective cache lines using existing flag bits in the cache to prevent the processor from accessing the defective cache lines when executing the object code.

Figure 3:
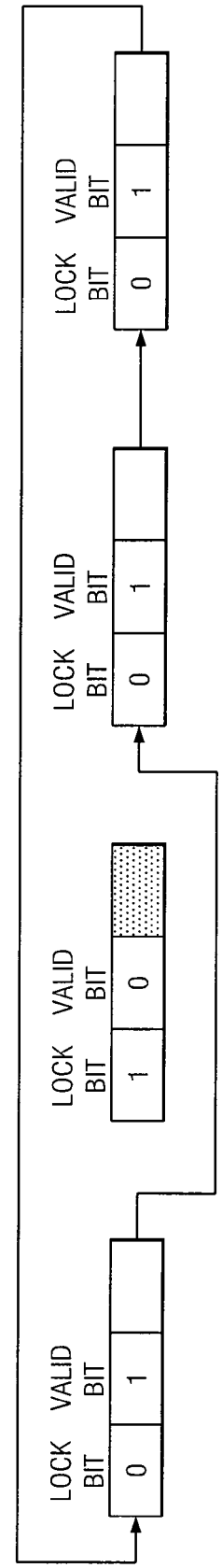
FIG. 3 illustrates an example cache-locking function.

FIG. 3 illustrates an example cache-locking function. Particular embodiments exploit an unused combination of existing flag bits, e.g., valid bit=0 and lock bit=1, to indicate a fault in a specific cache line. As an example and not by way of limitation, in a four-way set-associative cache including lock and valid bits, if the lock bit of Way1 in the fifth cache set is one and its valid bit is zero, as shown in FIG. 3, the corresponding cache line will not be used for replacement in case of a cache miss. If the valid bit of Way1 in the fifth cache set is zero, accessing the corresponding block will always cause a cache miss. Thus, in particular embodiments, the cache-locking function facilitates the correctness of the processor operation, even in presence of defects in tag or data memory. Some processors do not allow setting the lock bit for an invalid cache line. As a result, in some processors, valid bit=0 and lock bit=1 is an invalid combination. However, in particular embodiments, minor modification to the cache-control circuitry enables this combination of flag bits. For a set-associative cache, the associativity of the cache set that includes the faulty cache lines is reduced by one. In a direct-mapped cache, accesses to the cache set that includes the faulty cache line will cause a cache miss. Particular embodiments modify the placement of functions in the address space to compensate for the increased number of cache misses due to faulty cache lines. In particular embodiments, use of a cache-lock function obviates hardware overhead otherwise needed to improve performance of a processor having one or more defective caches.

Particular embodiments generate an instruction trace corresponding to an execution of the application program as follows:

$$(o_0, o_1, o_3, o_5, o_6, o_7, o_3, o_5, o_7, o_3, o_5, o_6, o_7, o_3) \quad (2)$$

Above, $o_i$ represents the $i^{th}$ instruction of the original object code. Assume $a_i$ represents the address of $o_i$. Each instruction $o_i$ may be mapped to a memory block having the address $$\left\lfloor \frac{a_i}{L} \right\rfloor,$$

where L is cache-line size in bytes. From the instruction trace, a trace of the memory-block addresses accessed, TMB=($b_1$, $b_1$, $b_2$, $b_3$, ... ), may be generated.

$X(b_i)$ may be defined as follows:

$$X(b_i) = \begin{cases} 1 & \text{if there are at least } W_s \text{ accesses} \\ & \text{to } s = (b_i \bmod S) \text{ between an access to} \\ & b_i \text{ and its next access} \\ 0 & \text{otherwise.} \end{cases}$$

$W_s$ is the number of nonfaulty cache lines in the $s^{th}$ cache set. The total number of misses can be calculated as follows:

$$M_{total} = \sum_{\forall b_i \in TMB} X(b_i) \quad (3)$$

The above formula takes into account the effect of faulty cache lines. Particular embodiments generate gaps in the object code, which in turn increases memory requirements associated with the object code, but do not increase the size of the object code.

Figure 4:
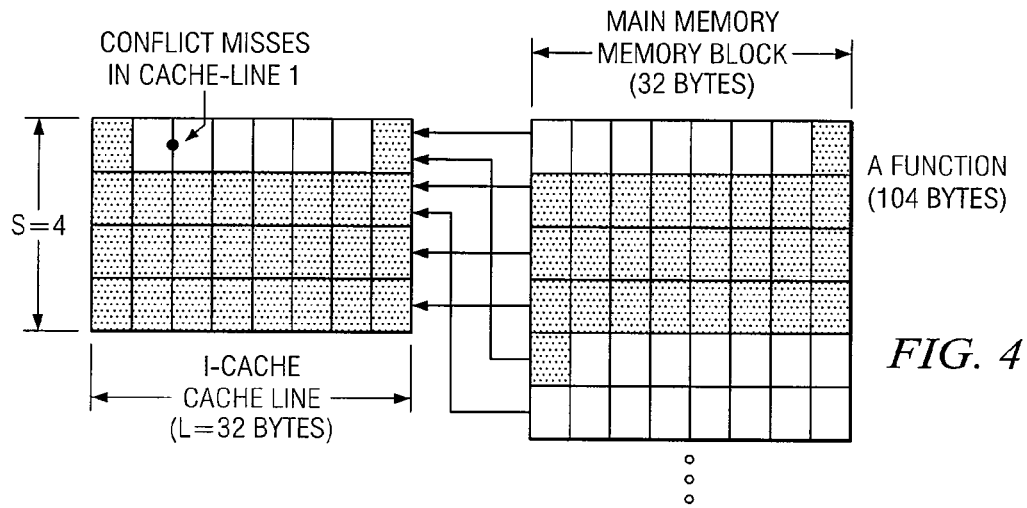
FIG. 4 illustrates an example self-conflict miss.

Particular embodiments generate a shorter trace that results in the same number of misses, but may be processed faster. FIG. 4 illustrates an example self-conflict miss. In FIG. 4, the function is smaller than the size of the cache. The left side of FIG. 4 shows a direct-mapped cache with four 32-byte lines. If a function having a size of 104 bytes is placed in the main memory, cache conflict misses occur in the first cache line because the first and last words of the function are mapped to the same cache line. If the size of the function is 100 bytes, no self-conflict miss occurs, regardless of where in the address space the function is placed. Therefore, the following is a condition of a function that never experiences self conflicts:

$$\text{Function Size} \leq L \times (S-1) + I \quad (4)$$

L, S, and I represent cache-line size in bytes, the number of cache sets, and instruction-word size in bytes, respectively. If a function satisfies the above condition, two instructions, $o_i$ and $o_j$, of the function will never evict each other, regardless of where in the address space the function is placed. As a result, when a loop is executed, if all instructions in the loop belong to the function and the loop is executed n times, n−1 instances may be deleted from the trace.

The following notations may be used in the problem formulation in particular embodiments:

S: Number of cache sets.
L: Cache line size in bytes.
$W_i$: Number of nonfaulty cache ways in the $i^{th}$ cache set.
$T_c$: Compacted trace of memory-block addresses accessed.
F: List of functions in the target program sorted in descending order of their execution counts.
$M_{total}$: Total number of cache misses.
$M_{bound}$: Upper bound of number of cache misses. The user may provide this parameter.

In particular embodiments, the problem may be formally defined as follows: for a given S, L, a set of $W_i$s, $T_c$, F, and $M_{bound}$, find an order of functions for which $M_{total}$ is less than $M_{bound}$. Particular embodiments use the following algorithm:

```
Procedure Defect_Aware_Code_Placement
Input: S, L, a set of W_i s, T_c, F, and M_bound
Output: order of functions in the optimized object code
  M_min = infinity;
  repeat
    for (t=0; t<|F|; t++) do
      p = F[t];   BEST_location = p;
      for each p' ∈ F and p'≠ p do
        Insert function p in the place of p';
        Update T_c according to the locations of functions;
        Calculate M_total using (3);
          if (M_total ≤ M_min) then
            M_min = M_total;
            BEST_location = p';
          end if
      end for
      Put function p in the place of BEST_location
    end for
  until (M_min < M_bound or M_min stops decreasing)
  Output order of functions
end Procedure
```

The above algorithm starts from an original object code and finds the optimal location of each function of the application program in the address space. This may be done by changing the order of placing functions in the address space and finding the best ordering. For each ordering, the algorithm updates the trace of memory block addresses executed ($T_c$) according to the locations of functions and calculates the total number of cache misses ($M_{total}$) using (3). The ordering yielding the minimum number of cache misses is selected. The algorithm continues as long as the number of cache misses reduces and is no less than $M_{bound}$. The computation time of the algorithm is quadratic in terms of the number of functions in the application program.

Particular embodiments have been used to describe the present invention. A person having skill in the art may comprehend one or more changes, substitutions, variations, alterations, or modifications to the particular embodiments used to describe the present invention that are within the scope of the appended claims. The present invention encompasses all such changes, substitutions, variations, alterations, and modifications.

What is claimed is:

1. A method for improving performance of a processor having a defective cache, the method comprising:
   accessing first object code of an application program; and generating second object code of the application program from the first object code, the generation of the second object code taking into account one or more locations of one or more defects in a cache on a processor such that one or more instructions in the second object code are written only to nondefective locations in the cache to keep a total number of cache misses below a predefined threshold.

2. The method of claim 1, further comprising:

generating an original trace of addresses of memory locations accessed during execution of the first object code; and using the original trace, calculating a number of cache misses.

3. The method of claim 2, further comprising generating a shorter trace of addresses of memory locations accessed during execution of the first object code, the shorter trace being shorter and processable faster than the original trace and operable to calculate the number of cache misses calculable by the original traces.

4. The method of claim 1, further comprising:

loading the second object code into the cache; and locking one or more of the defective locations such that accesses to the cache avoid one or more of the defective locations.

5. The method of claim 4, wherein locking one or more of the defective locations comprises locking one or more of the defective locations according to a locking function that uses a combination of otherwise unused flag bits in the cache.

6. The method of claim 5, wherein the combination of otherwise unused flag bits comprises a valid bit and a lock bit.

7. The method of claim 5, further comprising modifying circuitry associated with control of the cache to accommodate the locking function.

8. The method of claim 1, wherein the defective locations in the cache are cache lines.

9. The method of claim 1, wherein the cache is a set-associative cache.

10. The method of claim 1, wherein the cache is a direct-mapped cache.

11. A system for improving performance of a processor having a defective cache, the system comprising:

means for accessing first object code of an application program; and means for generating second object code of the application program from the first object code, the generation of the second object code taking into account one or more locations of one or more defects in a cache on a processor such that one or more instructions in the second object code are written only to nondefective locations in the cache to keep a total number of cache misses below a predefined threshold.

12. A system for improving performance of a processor having a defective cache, the system comprising:

means for detecting one or more locations of one or more defects in a cache on a fabricated processor;

means for generating object code from an application program, generation of the object code taking into account one or more of the locations of one or more of the defects in the cache on the fabricated processor if previously generated object code from the application program provides less than a predetermined level of performance in the fabricated processor, generation of the object code comprising reusing the previously generated object code if the previously generated object code provides at least the predetermined level of performance in the fabricated processor, means for marking one or more of the locations of one or more of the defects in the cache on the fabricated processor; and means for executing the object code.

* * * * *